Aug. 11, 1925.
D. GREENBERG
1,549,195
INSULATED HANDLE FOR COOKING UTENSILS OR OTHER VESSELS
Filed Feb. 9, 1924
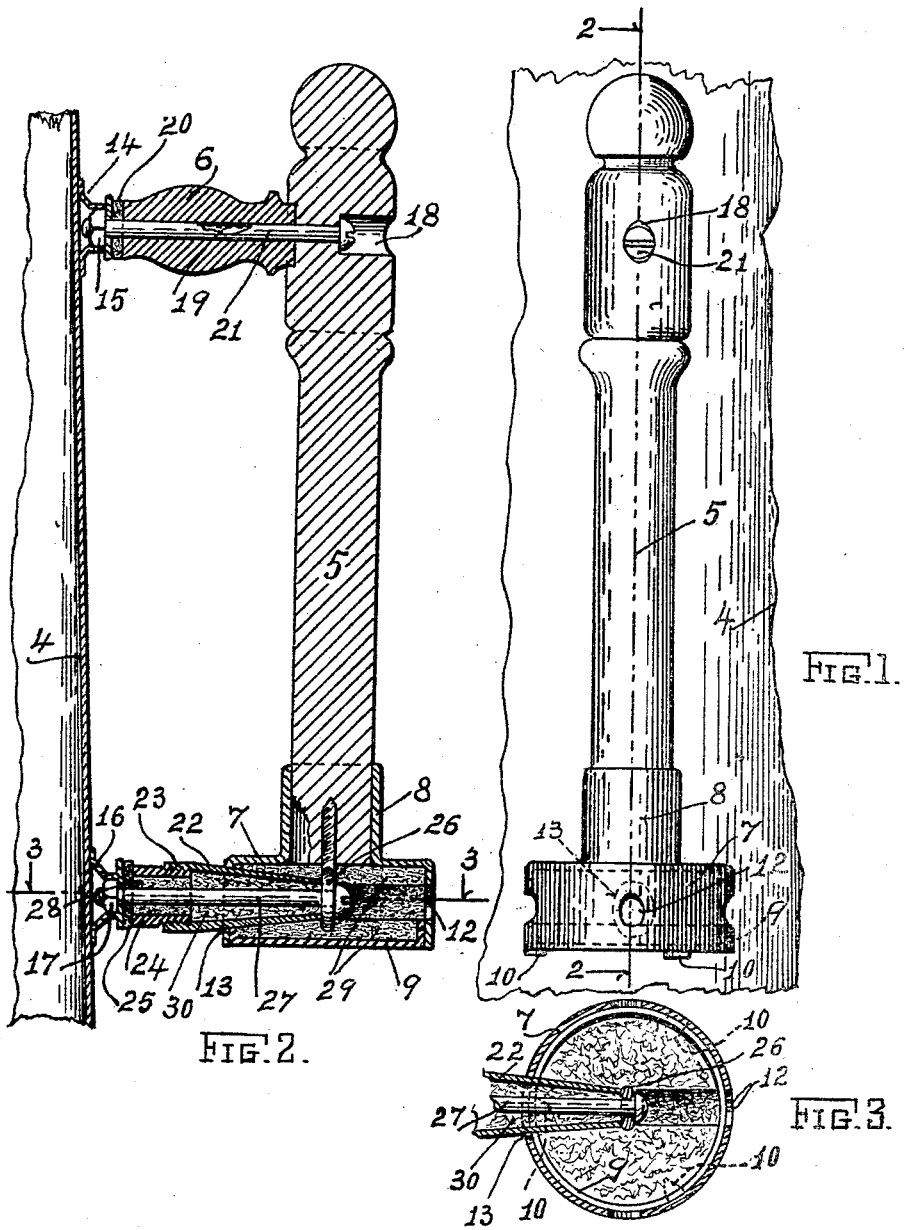
Witnesses.
Charlotte A. DuBois.
Ruth Fitzgerald
Inventor.
David Greenberg.
by Atty N. DuBois.

Patented Aug. 11, 1925.

1,549,195

UNITED STATES PATENT OFFICE.

DAVID GREENBERG, OF SPRINGFIELD, ILLINOIS.

INSULATED HANDLE FOR COOKING UTENSILS OR OTHER VESSELS.

Application filed February 9, 1924. Serial No. 691,816.

*To all whom it may concern:*

Be it known that I, DAVID GREENBERG, a citizen of the United States, residing at Springfield, in the county of Sangamon and State of Illinois, have invented a new and useful Insulated Handle for Cooking Utensils or Other Vessels, of which the following is a specification.

The invention relates primarily to insulated handles for percolators or other cooking utensils, but handles embodying the invention may be applied and used on other and different vessels.

The purpose of the invention is to provide simple and effective means whereby handles of combustible material, such as wood, cork, or the like, may be protected from the destructive action of the heat incident to the ordinary use of the vessel, and whereby the grip or hand-piece may, under ordinary conditions of use, be prevented from becoming hot enough to burn the bare hand of the user.

I attain this object by the mechanism illustrated in the accompanying drawings in which Figure 1 is a front elevation of an insulated handle embodying my invention; Fig. 2 is a vertical section taken on the line 2—2. of Fig. 1; and Fig. 3 is a horizontal section through the base and appurtenances, taken on the line 3—3. of Fig. 2. The same reference numerals designate the same parts in all the views.

The appliance will now be described in detail and the novel features thereof will be recited in the claims.

I have shown the insulated handle applied on a fragment 4 of a percolator. I have shown and prefer to use a hand-piece 5, of wood, cork, or other light non-conductive material. A bracket 6 preferably of wood connects the hand-piece with the percolator as will now be described. An attaching cup 14 is brazed on the percolator 4 and is of such shape as to hold against turning a nut 15 contained in the attaching cup. The hand-piece 5 has a radial bore 18 admitting a bolt 21 which extends through a lengthwise bore 19 in the bracket 6 and engages in the nut 15. An insulating washer 20 protects the outer end of the bracket 6. When the parts are assembled as shown the screw 21 will be rotated in the nut to securely connect the parts.

The lower part of the hand-piece 5 fits snugly inside of the tubular part 8 of the cup-like base 7. The base 7 has an opening 12 to admit the bolt 27 and an opening 13 to receive the tapered sleeve 22. A bottom cup 9 extends upwardly inside the base 7 and is secured by fingers 10 integral with the part 7, pressed upwardly against the under side of the bottom cup. A screw eye 26 screws into the lower end of the hand-piece 5. A tubular extension 24 screws into the screw-threaded part 23 of the sleeve. An attaching cup 16 brazed on the percolator 4 contains a non-rotative nut 17. An insulating washer 25 is placed between the attaching cup 16 and the extension 24. The extension 24 is removable in order that the hand-piece may be placed nearer the vessel to which it is to be attached, and in that case the washer 25 will bear on the outer end of the sleeve and the bolt 27 will be correspondingly shorter. The sleeve 22 extends into the base 7 and its inner end bears on the eye 26. When the parts are assembled as shown, the bolt 27, inserted through the opening 12 and through the eye 26, will extend through the sleeve and through the extension and will engage the nut 17, to securely connect the parts when the nut is tightened.

Insulating material 29, preferably asbestos paper fills the space inside the base 7 and inside the cup 9 as shown. Similar insulating material 30 inside the sleeve 22 and the extension 24, retards radiation of heat from the bolt 27, and air admitted through the opening 12 acts to cool the bolt.

From the foregoing description it will be apparent that the connecting bolts 21 and 27 are so thoroughly insulated that little heat will be conveyed to the hand-piece 5.

I am aware that insulated handles of various kinds have long been used, I therefore do not claim broadly that construction.

Having fully described my invention, what I claim as new and desire to secure by Letters Patent is:

1. An insulated handle comprising a non-conducting hand-piece; a cup-like base receiving the hand-piece; a screw-eye screwing into the hand-piece; a bottom cup fixed in said cup-like base; a sleeve extending into said base and bearing on said screw-eye; insulation in said base bottom cup and sleeve and means for securing said sleeve on the vessel to which it is attached.

2. In a detachable insulated handle, the combination of a non-conductive hand-piece; a hollow cup-like base receiving said hand-piece; a screw-eye screwing into the hand-piece; a sleeve extending into said base and bearing on said screw-eye; a bottom cup stationary in the base; a tubular extension screwing into said sleeve; a stationary attaching cup shaped to contain and prevent rotation of a nut; an insulating washer between said cup and said extension; a bolt extending through said screw-eye, sleeve, extension, and insulating washer and engaging said nut; insulating material surrounding said bolt; and insulating material occupying said cup-like base and said bottom cup.

3. An insulated handle comprising a non-conducting hand-piece having a radial bore; a non-conducting tubular bracket bearing on said hand-piece; an attaching cup shaped to contain and prevent rotation of a nut; an insulating washer between said attaching cup and said bracket; a bolt entered in the radial opening in the hand-piece and extending through the bracket and said washer and engaging said nut; in combination with a cup-like base receiving one terminal part of said hand-piece; a screw-eye screwing into said hand-piece; a bottom cup secured in said base; a sleeve extending into said base and bearing on said screw-eye to prevent rotation of the eye; an extension screwing into said sleeve; a second attaching cup; a non-rotative nut held in said second attaching cup; an insulating washer between said second attaching cup and said extension; a bolt extending through said screw-eye, sleeve, extension, and insulating washer and engaging the nut in said second attaching cup to secure the parts together.

4. An insulating handle comprising a non-conducting hand-piece; a cup-like base having diametrically opposite openings, one admitting air to said base and the other receiving a tapered sleeve extending into the base and detachably connected with the hand-piece; and non-conducting material in said base surrounding said sleeve.

In witness whereof I have hereunto signed my name at Springfield, Illinois, this 11th day of October, 1923.

DAVID GREENBERG.

Witnesses:
  JOE KATZ,
  BERNARD LEIDMAN.